April 21, 1925.  W. P. KENNEDY  1,534,528
RAT TRAP
Filed July 17, 1922
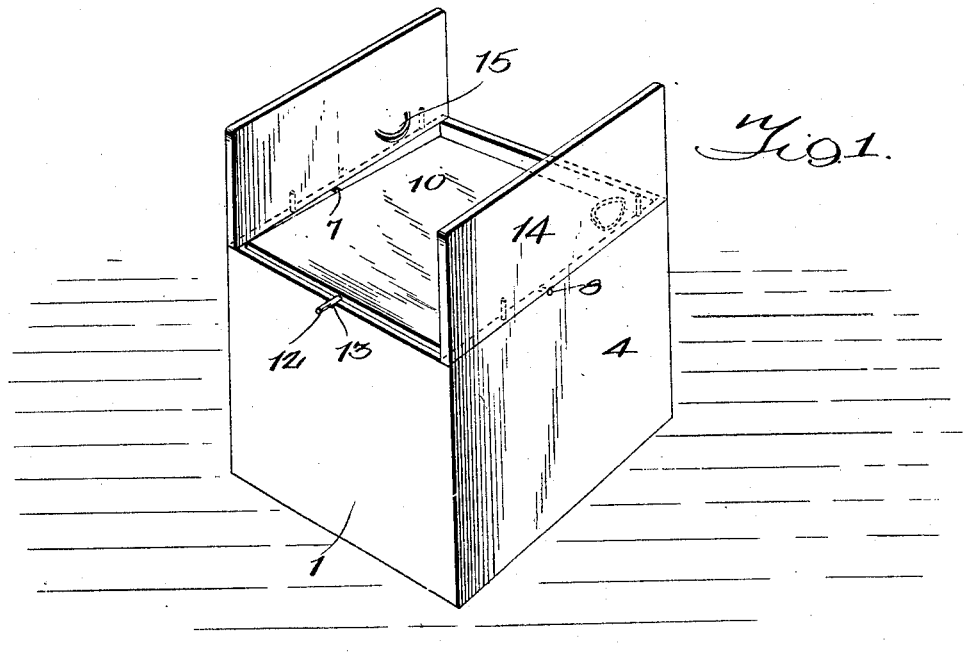
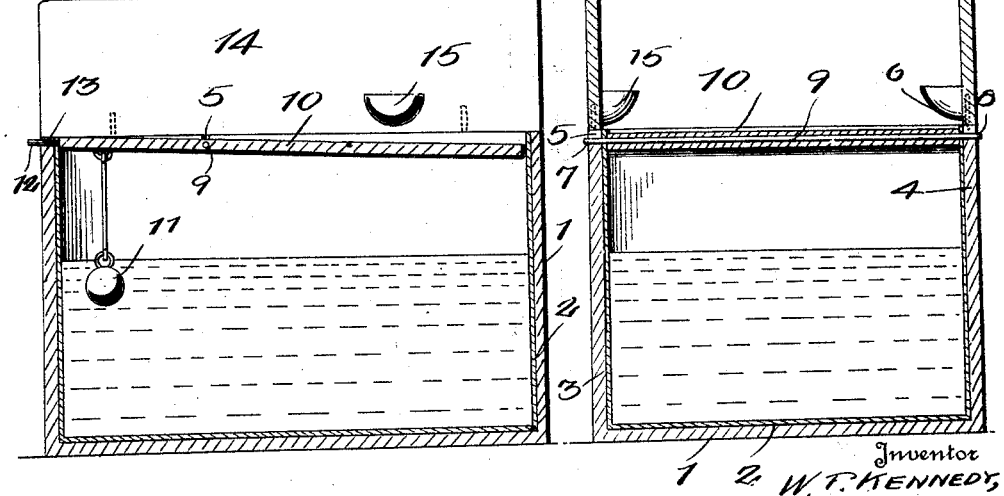

Patented Apr. 21, 1925.

1,534,528

UNITED STATES PATENT OFFICE.

WILLIS P. KENNEDY, OF ROGERSVILLE, ALABAMA.

RAT TRAP.

Application filed July 17, 1922. Serial No. 575,589.

*To all whom it may concern:*

Be it known that I, WILLIS P. KENNEDY, a citizen of the United States, residing at Rogersville, in the county of Lauderdale and State of Alabama, have invented certain new and useful Improvements in Rat Traps, of which the following is a specification.

This invention relates to a rat trap and has for its principal object to provide a trap which will be adapted to catch a relatively unlimited number of rats and other animals alive, without bodily injury, and furthermore provide a sanitary rat trap.

Another object of the invention is to provide a rat trap of the above mentioned character, which is simple in construction, inexpensive in manufacture, strong and durable.

A still further object of the invention is to provide a rat trap of the above mentioned character which can be easily and quickly assembled and will also prevent the escape of the rat after it has once been trapped.

Other objects and advantages of this invention will become apparent during the course of the following description.

In the accompanying drawings forming a part of the description and in which like numerals designate like parts throughout the several views, Figure 1 is a perspective view of the rat trap.

Figure 2 is a central longitudinal section of the same, and

Figure 3 is a transverse section of the rat trap.

In the drawings forming a part of the specification wherein for the purpose of illustration is shown the preferred embodiment of the invention, the numeral 1 designates a suitable receptacle and has its inner sides and bottom lined with suitable material 2. The purpose of providing the receptacle 1 with suitable lining 2 is to allow the receptacle 1 to be filled with water without any danger of the water leaking from the sides or bottom of the receptacle. The receptacle 1 is further provided with an open top portion for the purpose to be hereinafter fully described.

Formed in the opposite sides 3 and 4 of the receptacle 1 and in the upper ends thereof and also adjacent one end of the receptacle are the notches 5 and 6. These notches 5 and 6 which are formed in the sides 3 and 4 respectively are adapted to receive the ends 7 and 8 respectively of a shaft 9. This shaft 9 extends across the width of the receptacle 1 and is adapted to have its ends 7 and 8 rest in the notches 5 and 6 respectively formed in the opposite sides of the receptacle.

A suitable platform 10 is adapted to fit into the open upper end of the receptacle 1 and is pivotally mounted therein upon the shaft 9. The shaft 9 and the platform 10 are so arranged with relation to the container 1 that the outer portion of the platform 10 is of less width than the inner portion of the platform. This is more clearly illustrated in Fig. 2 of the drawings. A suitable weight 11 is carried on the under side of the outer portion of the platform 10 and is adapted to normally extend downwardly into the receptacle 1 for the purpose of normally keeping the platform in a horizontal position. The outer portion of the platform 10 is provided with an outwardly extending arm 12 which is adapted to rest within the notched portion formed in one end of the receptacle 1. The purpose of providing the platform with an extending arm 12 which is adapted to fit within the notch 13 formed in the end of the receptacle 1 is to prevent the platform from having its outer end or portion swinging downwardly into the receptacle.

Upwardly extending bait holders 14 are adapted to rest upon the open end of the receptacle 1 and are supported there on and arranged on the notched sides 3 and 4 by means of upstanding pins, which are provided on the upper ends of the open part of the receptacle. There are two of these plates and one is arranged on one of the notched sides 3 and the other is supported on the opposite notched side 4. By such an arrangement it will be seen that the ends 7 and 8 of the shaft 9 will be prevented from accidentally moving in a vertical plane so as to dislodge the same and the platform carried thereby from its operating position. These bait holder plates 14 are provided with bait receptacles 15 which are formed on the inner side of the bait holder plates 14 and are arranged near the end of the longer portion of the platform 10.

In use, water is placed within the container and the trap is then ready for operation. When a rat or other animal approaches the trap 1 and enters or walks upon the platfrom 10, as soon as the rat reaches the point where the bait holders 15 are arranged on the bait holder plates 14, the weight of the rat on the platform 10 will cause the platform 10 to tilt and thereby throwing or dropping the rat into the container 1 and the water contained in the container 1 will drown the rat. After the rat has left the platform 10 the weight 11 will cause the platform 10 to return to its normal position and therefore the trap will be allowed to be again set in operative position. In this manner an unlimited number of rats may be caught without the necessity of resetting the trap after each one is caught, and also a sanitary rat trap is provided whereby the rat is drowned upon coming in contact with the water which is contained within the receptacle.

It is to be understood that the form of my invention herewith shown and described is to be taken as the preferred embodiment of the same, and that various changes in the shape, size and arrangement of parts, may be resorted to without departing from the spirit of the invention or the scope of the appended claim.

Having thus described my invention what I claim is:—

An animal trap comprising an open top rectangular receptacle embodying end, side and bottom walls, one end wall having an open notch in the central portion of its upper edge and the side walls having transversely aligned notches in their upper edges nearer said one end wall than the other end wall, a tilting platform arranged within and normally closing the the top of the receptacle and including a transverse shaft having projecting ends seated in the notches of the side walls, an outwardly projecting pin carried by one end of the platform and normally seated in the notch of said one end wall to prevent downward tilting of the platform from its normal position in one direction, a weight suspended from said one end of the platform within the receptacle to normally cause the platform to assume its receptacle-closing position, upright plates removably pinned upon the upper edges of the side walls of the receptacle and overlying the projecting ends of the platform shaft to maintain the latter in the notches of the side walls, and bait receptacles supported by the upright plates and arranged at the inner sides of the latter adjacent the other end of the platform.

In testimony whereof I affix my signature in presence of two witnesses.

WILLIS P. KENNEDY.

Witnesses:
CHARLES P. McMEANS,
CHARLES H. BEDINGFIELD.